(12) United States Patent
 Hamby

(10) Patent No.: US 12,683,458 B2
(45) Date of Patent: Jul. 14, 2026

(54) HYBRID COMPRESSED GAS-ELECTRIC PISTON ENGINE

(71) Applicant: W. Daniel Hamby, Valdese, NC (US)

(72) Inventor: W. Daniel Hamby, Valdese, NC (US)

( * ) Notice: Subject to any disclaimer, the term of this patent is extended or adjusted under 35 U.S.C. 154(b) by 306 days.

(21) Appl. No.: 18/379,528

(22) Filed: Oct. 12, 2023

(65) Prior Publication Data

US 2024/0128831 A1 Apr. 18, 2024

Related U.S. Application Data

(60) Provisional application No. 63/379,182, filed on Oct. 12, 2022.

(51) Int. Cl.
 *H02K 7/00* (2006.01)
 *F15B 15/14* (2006.01)

(52) U.S. Cl.
 CPC ............... *H02K 7/00* (2013.01); *F15B 15/14* (2013.01)

(58) Field of Classification Search
 CPC .... H04N 1/40087; F15B 15/14; H02K 33/00; H02K 7/00; H02K 7/14
 See application file for complete search history.

(56) References Cited

U.S. PATENT DOCUMENTS

| | | | |
|---|---|---|---|
| 2008/0079320 A1 | 4/2008 | Beaulieu | |
| 2010/0066181 A1* | 3/2010 | Keller | H02K 53/00 310/20 |
| 2012/0291743 A1 | 11/2012 | Hamby | |
| 2013/0302181 A1* | 11/2013 | Charity, III | F04B 53/1082 417/416 |

FOREIGN PATENT DOCUMENTS

| | | | |
|---|---|---|---|
| EP | 2201219 B1 * | 6/2014 | .............. F01B 23/10 |
| WO | 2010014890 A1 | 2/2010 | |

OTHER PUBLICATIONS

International Search Authority, "International Search Report", PCT/US2023/035052, mailed Jan. 24, 2024.
International Search Authority, "Written Opinion", PCT/US2023/035052, mailed Jan. 24, 2024.

* cited by examiner

*Primary Examiner* — Naishadh N Desai

(74) *Attorney, Agent, or Firm* — Jeffrey C. Watson, Esq.; Grell & Watson Patent Attorneys LLC

(57) ABSTRACT

A hybrid compressed gas-electric piston engine includes a piston configured to move longitudinally inside of a cylinder for rotating a crank shaft. A first electromagnetic component is affixed to the piston. A second electromagnetic component is affixed in position on the engine relative to the cylinder. Wherein, the piston is configured to be moved longitudinally inside of the cylinder for rotating the crank shaft via compressed gas, electricity, or a combination thereof. For compressed gas, the piston is moved by introducing the compressed gas into the cylinder. For electricity, the piston is moved by electricity flowing into the first electromagnetic component affixed to the piston, the second electromagnetic component affixed in position on the engine relative to the cylinder, or both, thereby creating magnetic forces between the first electromagnetic component and the second electromagnetic component.

20 Claims, 11 Drawing Sheets

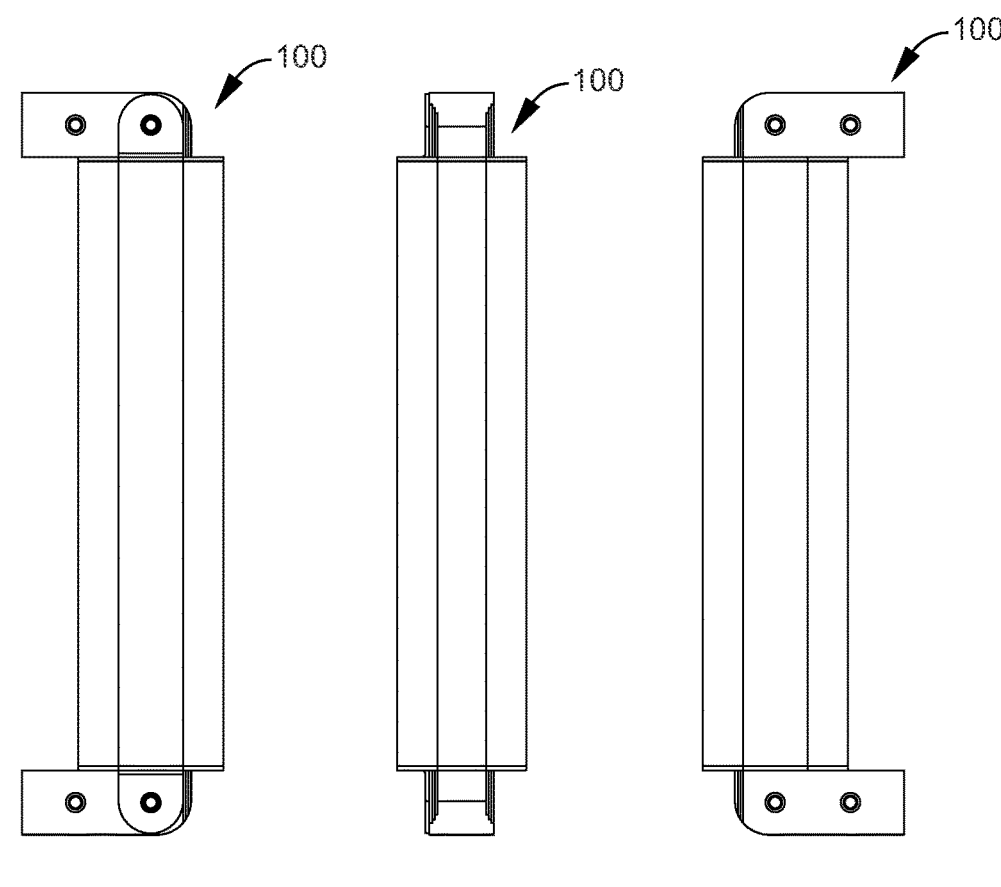
FIG. 10C          FIG. 10D          FIG. 10E
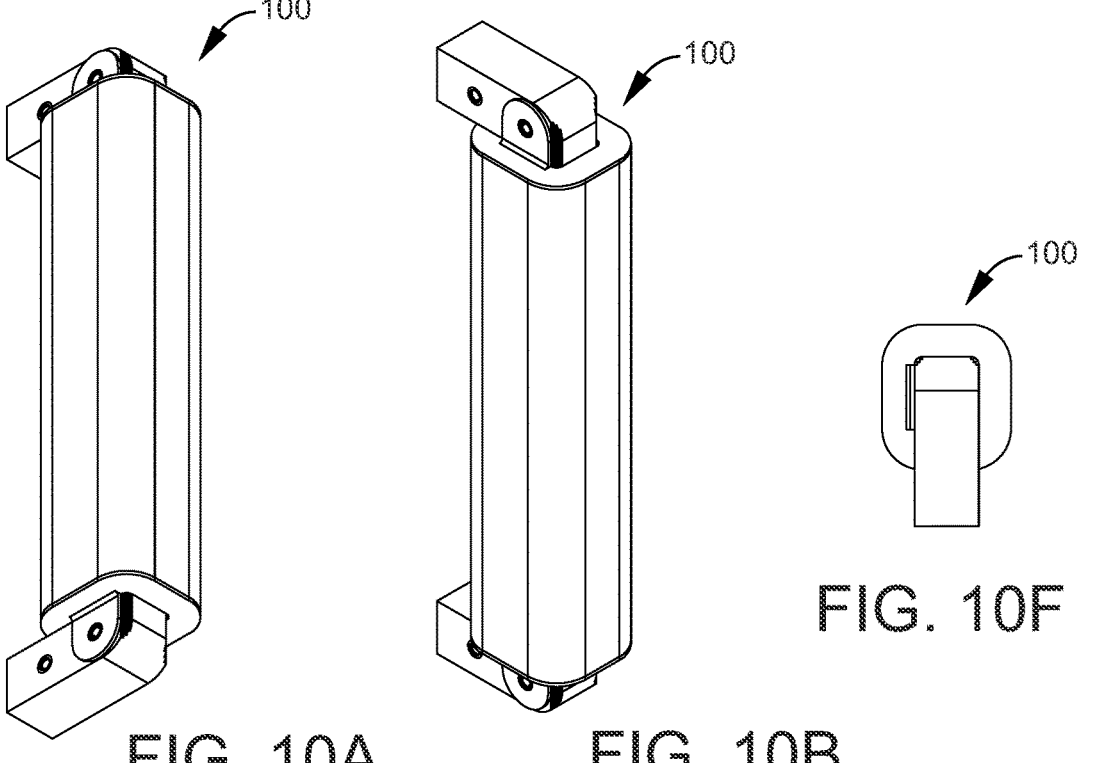
FIG. 10F
FIG. 10A          FIG. 10B

HYBRID COMPRESSED GAS-ELECTRIC PISTON ENGINE

CROSS-REFERENCE TO RELATED APPLICATIONS

This application claims benefit to U.S. Provisional Patent Application No. 63/379,182, filed on Oct. 12, 2022, which is incorporated by reference in its entirety.

FIELD OF THE DISCLOSURE

The present disclosure is directed to engines, like piston cylinder engines or compressed gas or air piston cylinder engines. More specifically, the present disclosure is related to a hybrid compressed gas-electric piston engine.

BACKGROUND

In this document, for any reference to pressurized gas the assumption is compressed gas. Other types of gases are possible but may require modifications or changes in the use of materials. As examples, and clearly not limited thereto, the system can also operate on high pressure steam, or an external combusted fuel, or any other compressed gas.

References to a coincycle engine refers to active patents held by the instant inventor, W. Daniel Hamby. Namely, any reference to a coincycle engine refers to U.S. Pat. No. 9,016,256, entitled Concentric Cylinder Engine, which is incorporated herein in its entirety.

Generally speaking, a compressed gas or air piston cylinder, also known as a pneumatic motor or air motor, is a type of motor which does mechanical work by expanding compressed air. Pneumatic motors generally convert the compressed air energy to mechanical work through either linear or rotary motion. Linear motion can come from either a diaphragm or a piston actuator. The instant disclosure may be related to compressed air piston cylinders with linear motion from piston actuators.

Piston motors are the most commonly used in hydraulic systems. In order to achieve linear motion from compressed air, a system of pistons is most commonly used. The compressed air is fed into an air-tight chamber that houses the shaft of the piston. Also inside this chamber a spring is coiled around the shaft of the piston in order to hold the chamber completely open when air is not being pumped into the chamber. As air is fed into the chamber the force on the piston shaft begins to overcome the force being exerted on the spring. As more air is fed into the chamber, the pressure increases and the piston begins to move down the chamber. When it reaches its maximum length the air pressure is released from the chamber and the spring completes the cycle by closing off the chamber to return to its original position. Piston motors are often used in series of two, three, four, five, or six cylinders that are enclosed in a housing. This allows for more power to be delivered by the pistons because several motors are in sync with each other at certain times of their cycle.

The practical mechanical efficiencies attained by a piston air motor are between 40%-50%. Therefore, a need clearly exists for providing a more efficient piston air motor.

In addition, the life span or duration of life of a piston air motor and/or an electric motor may be less than desired. Namely, the life span of any zero emission vehicles, equipment, the like, and any device that would use a piston engine and/or an electric motor would clearly benefit from a longer life span of operation. Therefore, a need clearly exists for providing a longer lasting piston air motor and/or electric motor.

The instant disclosure may be designed to address at least certain aspects of the problems or needs discussed above by providing a hybrid compressed gas-electric piston engine.

SUMMARY

The present disclosure may solve the aforementioned limitations of the currently available engines, by providing a hybrid compressed gas-electric piston engine. The hybrid compressed gas-electric engine may include a piston configured to move longitudinally inside of a cylinder for rotating a crank shaft. A first electromagnetic component may be affixed to the piston. A second electromagnetic component may be affixed in position on the engine relative to the cylinder. Wherein, the piston may be configured to be moved longitudinally inside of the cylinder for rotating the crank shaft via compressed gas, electricity, or a combination thereof. For compressed gas, the piston is moved by introducing the compressed gas into the cylinder. For electricity, the piston is moved by electricity flowing into the first electromagnetic component affixed to the piston, the second electromagnetic component affixed in position on the engine relative to the cylinder, or both, thereby creating magnetic forces between the first electromagnetic component and the second electromagnetic component for moving the piston.

One feature of the disclosed hybrid compressed gas-electric piston engine may be that when the piston is being moved by the combination of the compressed gas and the electricity, the hybrid compressed gas-electric piston engine is configured to increase a performance and a duration of operation of the engine, like for use in zero emission vehicles, equipment, and any device that would use an electric motor or a piston engine.

Another feature of the disclosed hybrid compressed gas-electric piston engine may be that when the piston is being moved via the compressed gas introduced into the cylinder, the hybrid compressed gas-electric piston engine may be configured for creating electricity via the magnetic forces between the first electromagnetic component and the second electromagnetic component.

Another feature of the disclosed hybrid compressed gas-electric piston engine may be that when the piston is being moved via the magnetic forces created between the first electromagnetic component and the second electromagnetic component via electricity, the hybrid compressed gas-electric piston engine may be configured for creating compressed gas.

Another feature of the disclosed hybrid compressed gas-electric piston engine may be that the hybrid compressed gas-electric engine may be configured to generate, store, and retrieve energy in the form of compressed gas, electricity, or both.

In select embodiments of the disclosed hybrid compressed gas-electric piston engine, the first electromagnetic component may be a first electromagnet affixed to the piston, and the second electromagnetic component may be a second electromagnet affixed in position on the engine relative to the cylinder. In these embodiments, when a first current is applied to both the first electromagnet and the second electromagnet, a repulsive force may be created between the first electromagnet affixed on the piston and the second electromagnet affixed in position on the engine relative to the cylinder thereby moving the piston in a first direction longitudinally in the cylinder. And when an opposite current is applied to the first electromagnet and the first current is applied to the second electromagnet, or vice versa, an attractive force may be created between the first electromagnet affixed on the piston and the second electromagnet affixed in position on the engine relative to the cylinder thereby moving the piston in a second direction longitudinally in the cylinder.

In select embodiments of the disclosed hybrid compressed gas-electric piston engine, the first electromagnet affixed to the piston may include an inner coil with an inner magnet core. The second electromagnet affixed in position on the engine relative to the cylinder may include an outer coil with an outer magnet core. In these embodiments, when the first current is applied to both the inner coil and the outer coil, the repulsive force is created between the inner magnet core and the outer magnet core thereby moving the piston in the first direction longitudinally in the cylinder. And when an opposite current is applied to the inner coil and the first current is applied to the outer coil, or vice versa, the attractive force is created between the inner magnet core and the outer magnet core thereby moving the piston in the second direction longitudinally in the cylinder.

In select embodiments of the disclosed hybrid compressed gas-electric piston engine, the inner magnet core with the inner coil embedded therein may be affixed approximate a top of the piston. In this embodiment, the outer magnet core with the outer coil embedded therein may be affixed to a center head around the top portion of the cylinder. In this embodiment, when the first current is applied to both the inner coil and the outer coil, the repulsive force is created between the inner magnet core and the outer magnet core thereby moving the piston in the first direction down the cylinder away from the center head. And when the opposite current is applied to the inner coil and the first current is applied to the outer coil, or vice versa, an attractive force is created between the inner magnet core and the outer magnet core thereby moving the piston in the second direction up the cylinder toward the center head.

In select embodiments of the disclosed hybrid compressed gas-electric piston engine, the inner coil and the outer coil may include windings of copper or aluminum wire. These windings of copper or aluminum wire may be configured to create a magnetic field in the inner magnet core and the outer magnet core, respectively.

In select embodiments of the disclosed hybrid compressed gas-electric piston engine, the piston may include attachment means for the inner magnet core with the inner coil embedded therein. The attachments means may be any attachment means, including any mechanical attachments. Or in other select embodiments, the inner magnet core with the inner coil embedded therein may be integrally formed with the piston.

In select embodiments of the disclosed hybrid compressed gas-electric piston engine, the inner magnet core and the outer magnet core may include electric steel configured to concentrate magnetic flux generated by the inner coil and the outer coil, respectively, to form defined electro magnets.

In other select embodiments of the disclosed hybrid compressed gas-electric piston engine, the first electromagnetic component may be a first magnetic material affixed to the piston, and the second electromagnetic component may be a second electromagnet fixed in position on the engine relative to the cylinder, or vice versa, thereby creating a solenoid driven piston. In these solenoid driven piston embodiments, when a first current is applied to the second electromagnet, a first directional force may be created between the first magnetic material and the second electromagnet thereby moving the solenoid driven piston in a first solenoid direction longitudinally in the cylinder. And when an opposite current is applied to the second electromagnet, a second directional force may be created between the first magnetic material and the second electromagnet thereby moving the solenoid driven piston in a second solenoid direction longitudinally in the cylinder.

In select embodiments of the disclosed hybrid compressed gas-electric piston engine, the first magnetic material affixed to the piston may be a piston magnet that may be affixed to the piston and may extend from a top of the piston above the cylinder. In these embodiments, the second electromagnet may be a coil winding that may be positioned above the cylinder with the piston magnet configured to move longitudinally therein. In select embodiments, the coil winding of the second electromagnet may be positioned between a bottom flux plate and a top flux plate. Wherein the bottom flux plate may be positioned at a top of the cylinder and the top flux plate may be positioned under an engine head. In select embodiments, the coil winding of the second electromagnet may be a single cylinder coil winding. In other select embodiments, the coil winding of the second electromagnet may be an array of laminated coil assemblies. The array of laminated coil assemblies may be configured to reduce the voltage required to be carried over wiring to the second electromagnet.

Another feature of the disclosed hybrid compressed gas-electric piston engine may be that the compressed gas may be high-pressure air, high-pressure steam, an external combusted fuel, or another highly compressed gas. In select possibly preferred embodiments, the compressed gas may be high-pressure air.

In select embodiments of the disclosed hybrid compressed gas-electric piston engine, the piston may include mountings for sealing rings. The mountings may be for both at least one compression sealing ring and at least one lubrication sealing ring.

Another feature of the disclosed hybrid compressed gas-electric piston engine may be that it can be used on a conventional engine.

Another feature of the disclosed hybrid compressed gas-electric piston engine may be that it can be used on a coincycle engine (see U.S. Pat. No. 9,016,256, referred to herein in its entirety). In select embodiments, the coincycle engine embodiment with the disclosed hybrid compressed gas-electric piston engine may include an inner piston with a first electromagnet affixed thereto. A center sleeve may be included with a second electromagnet affixed thereto. The inner piston may be configured to move longitudinally in the center sleeve. An outer toroidal piston may be included with a third electromagnet affixed thereto. The outer toroidal piston may be configured to move longitudinally along an outside of the center sleeve. Wherein, when a first current is applied to both the first electromagnet and the second electromagnet, a repulsive force may be created between the first electromagnet affixed on the inner piston and the second electromagnet affixed on the center sleeve thereby moving the inner piston in a first inner direction longitudinally in the center sleeve. When an opposite current is applied to the first electromagnet and the first current is applied to the second electromagnet, or vice versa, an attractive force is created between the first electromagnet affixed on the inner piston and the second electromagnet affixed on the center sleeve thereby moving the inner piston in a second inner direction longitudinally in the center sleeve. When the first current is applied to both the second electromagnet and the third electromagnet, the repulsive force may be created between the second electromagnet affixed on the center sleeve and the third electromagnet affixed on the outer toroidal piston thereby moving the outer toroidal piston in a first outer direction longitudinally on the outside of the center sleeve. And when the opposite current is applied to the second electromagnet and the first current is applied to the third electromagnet, or vice versa, an attractive force is created between the second electromagnet affixed on the center sleeve and the third electromagnet affixed on the outer toroidal piston thereby moving the outer toroidal piston in a second outer direction longitudinally on the outside of the center sleeve.

In select embodiments, the disclosed hybrid compressed gas-electric piston engine may further include: an engine block configured to provide mounting for all components; a head providing mounting for all valves assemblies, injectors, and seals all cylinders; an injector configured to allow high-pressure gas to fill the cylinders; a center head or air electric module configured for providing adaption for existing engine blocks to convert IC (Internal Combustion) engines into an Air-Electric engine, where, for new engine assemblies, the center head or air electric module can be configured to be incorporated into the engine block; a connecting rod; a wrist pin; an exhaust valve; a valve spring assembly, the like, and/or combinations thereof.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which:

FIG. 10A is a bottom perspective view of a laminated coil assembly according to select embodiments of the instant disclosure for use in the array of laminated coil assemblies from FIG. 9A;

FIG. 10B is a top perspective view of the laminated coil assembly from FIG. 10A;

FIG. 10C is a left side view of the laminated coil assembly from FIG. 10A;

FIG. 10D is a front view of the laminated coil assembly from FIG. 10A;

FIG. 10E is a right-side view of the laminated coil assembly from FIG. 10A;

FIG. 10F is a top view (or bottom view) of the laminated coil assembly from FIG. 10A;

Figure 1:
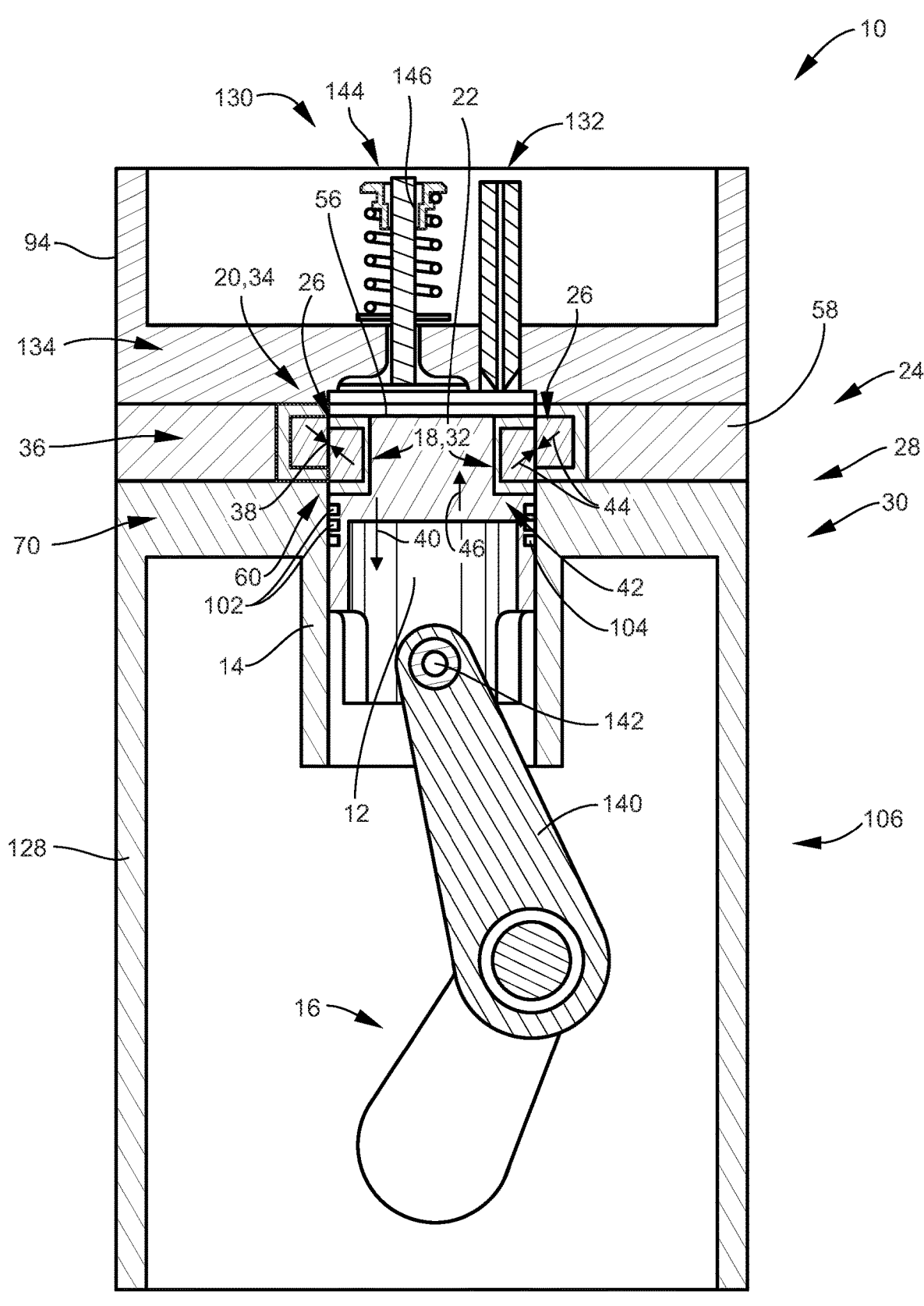
FIG. 1 is a sectional view of the hybrid compressed gas-electric piston engine according to select embodiments of the instant disclosure being used with a conventional engine.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-11, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

The present disclosure solves the aforementioned limitations of the currently available engines or motors by providing hybrid compressed gas-electric piston engine 10. Hybrid compressed gas-electric engine 10 may include piston 12 configured to move longitudinally inside of cylinder 14 for rotating crank shaft 16. First electromagnetic component 18 may be affixed to piston 12. Second electromagnetic component 20 may be affixed in position on engine 10 relative to cylinder 14. Wherein, piston 12 may be configured to be moved longitudinally inside of cylinder 14 for rotating crank shaft 16 via compressed gas 22, electricity 24, or a combination thereof. For compressed gas 22 operation, piston 12 may be moved by introducing compressed gas 22 into cylinder 14, like above piston 12 in the squish space, via injector port 132. This compressed gas 22 operation may be similar to a standard compressed air piston engine. For electricity 24 operation, piston 12 may be moved by electricity 24 flowing into first electromagnetic component 18 affixed to piston 12, second electromagnetic component 20 affixed in position on engine 10 relative to cylinder 14, or both, thereby creating magnetic forces 26 between first electromagnetic component 18 and second electromagnetic component 20 for moving piston 12. This electricity 24 operation of hybrid compressed gas-electric piston engine 10 may be a new feature for a standard air piston engine for creating the hybrid dynamic of the disclosed hybrid compressed gas-electric piston engine 10. This electricity 24 operation of hybrid compressed gas-electric piston engine 10 may be retrofitted to existing standard compressed air piston engines, or it may be manufactured in new compressed air piston engines for creating hybrid compressed gas-electric piston engine 10.

One feature of hybrid compressed gas-electric piston engine 10 may be that when piston 12 is being moved by the combination of compressed gas 22 and electricity 24, hybrid compressed gas-electric piston engine 10 may be configured to increase a performance and a duration of operation of the engine, like compared to a standard compressed gas piston engine and/or a standard electric motor or engine. As such, hybrid compressed gas-electric piston engine 10 may be configured for use in zero emission vehicles, equipment, and any device that would use an electric motor or a piston engine for increasing its efficiency, performance, and/or duration of operation of the engine or motor.

Another feature of hybrid compressed gas-electric piston engine 10 may be that when piston 12 may be moved via compressed gas 22 introduced into cylinder 14, hybrid compressed gas-electric piston engine 10 may be configured for creating electricity 24 via the magnetic forces 26 between first electromagnetic component 18 and second electromagnetic component 20. This feature may be used for charging batteries, adding power to an electrical grid, the like etc.

Another feature of hybrid compressed gas-electric piston engine 10 may be that when piston 12 is being moved via magnetic forces 26 created between first electromagnetic component 18 and second electromagnetic component 20 via electricity 24, hybrid compressed gas-electric piston engine 10 may be configured for creating compressed gas 22. This feature may be used for replenishing and/or storing compressed gas for future use.

As a result of the two features noted above, another feature of hybrid compressed gas-electric piston engine 10 may be that hybrid compressed gas-electric engine 10 may be configured to generate, store, and retrieve energy in the form of compressed gas 22, electricity 24, or both.

First electromagnetic component 18 and/or second electromagnetic component 20 may be any device, component, or assembly capable of creating magnetic forces configured for moving piston 12 longitudinally within cylinder 14. As an example, and clearly not limited thereto, in select embodiments first electromagnetic component 18 and second electromagnetic component 20 may both be electromagnets. In another example, and clearly not limited thereto, first electromagnetic component 18 may be an electromagnet and second electromagnetic component 20 may be a magnetic material, like electric steel, or the like. Or vice versa, in another example, and clearly not limited thereto, second electromagnetic component 20 may be a electromagnet and first electromagnetic component 18 may be a magnetic material, like electric steel, or the like. In addition to the various electromagnetic component configurations that may be utilized with first electromagnetic component 18 and/or second electromagnetic component 20, the position and/or location of first electromagnetic component 18 and/or second electromagnetic component 20 may be anywhere in engine 10 for creating magnetic forces configured for moving piston 12 longitudinally within cylinder 14. As examples, and clearly not limited thereto, first electromagnetic component 18 may be attached around the top of piston 12, around the bottom of piston 12, or be a protrusion from the top or bottom of piston 12. Likewise, as examples, and clearly not limited thereto, second electromagnetic component 20 may be affixed to the top of cylinder 14 around the top of piston 12, to the bottom of cylinder 14 around the bottom of piston 12, or be positioned on the top or bottom of cylinder 14 around a protrusion from the top or bottom of piston 12.

Figure 2:
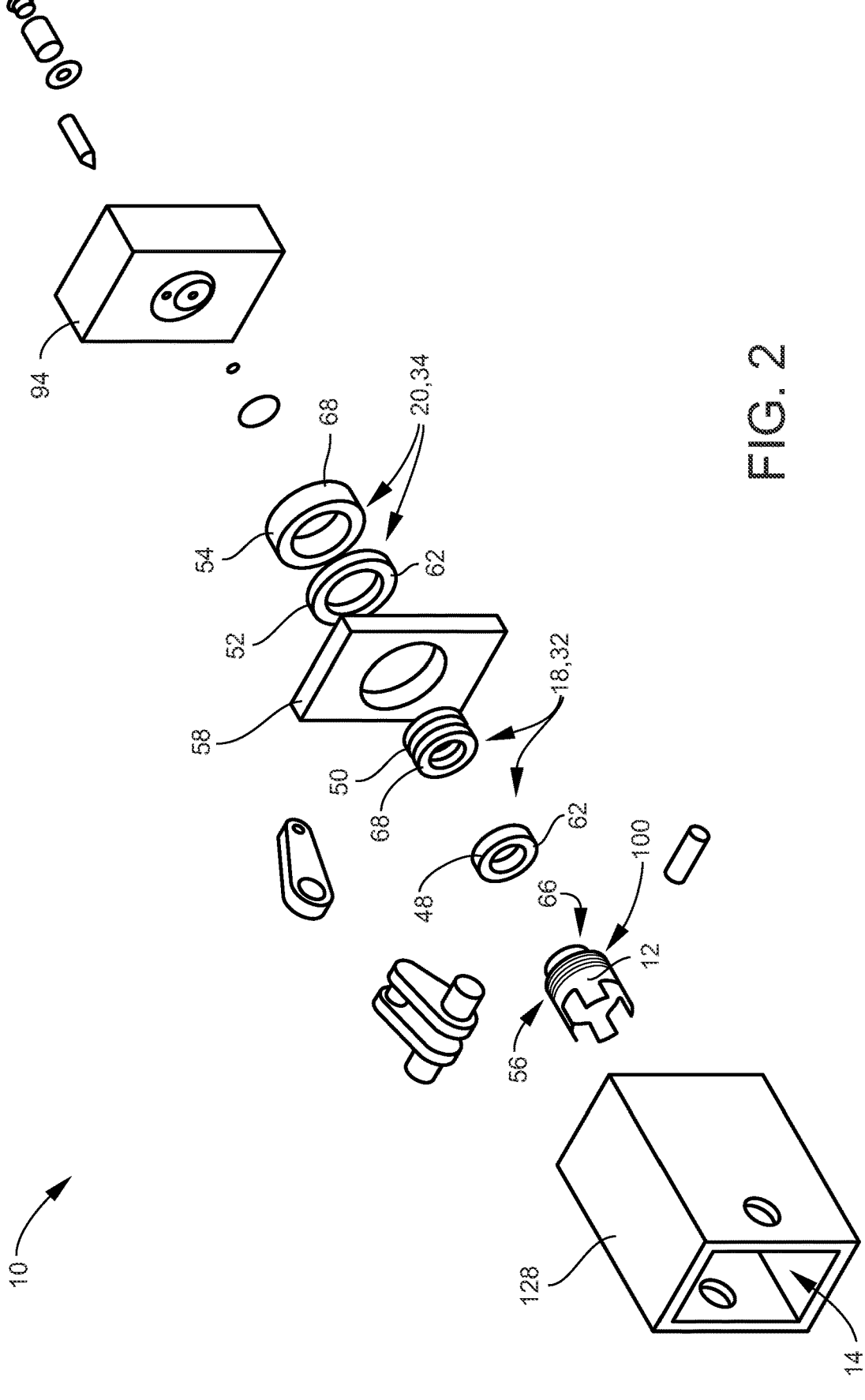
FIG. 2 is an exploded view of the hybrid compressed gas-electric piston engine from FIG. 1 being used with a conventional engine.

Referring now specifically to FIGS. 1-2, in select embodiments of hybrid compressed gas-electric piston engine 10, first electromagnetic component 18 may be first electromagnet 32 affixed to piston 12, and second electromagnetic component 20 may be second electromagnet 34 affixed in position on engine 10 relative to cylinder 14. In these embodiments, when first current 36 is applied to both first electromagnet 32 and second electromagnet 34, repulsive force 38 may be created between first electromagnet 32 affixed on piston 12 and second electromagnet 34 affixed in position on engine 10 relative to cylinder 14 thereby moving piston 12 in first direction 40 longitudinally in cylinder 14. And when opposite current 42 is applied to first electromagnet 32 and first current 36 is applied to second electromagnet 34, or vice versa, attractive force 44 may be created between first electromagnet affixed 32 on piston 12 and second electromagnet 34 affixed in position on engine 10 relative to cylinder 14 thereby moving piston 12 in second direction 46 longitudinally in cylinder 14.

Still referring to FIGS. 1-2, in select embodiments of hybrid compressed gas-electric piston engine 10, first electromagnet 32 affixed to piston 12 may include inner coil 48 with inner magnet core 50. Second electromagnet 34 affixed in position on engine 10 relative to cylinder 14 may include outer coil 52 with outer magnet core 54. In these embodiments, when first current 36 is applied to both inner coil 48 and outer coil 52, repulsive force 38 is created between inner magnet core 50 and outer magnet core 54 thereby moving piston 12 in first direction 40 longitudinally in cylinder 14. And when opposite current 42 is applied to inner coil 48 and first current 36 is applied to outer coil 52, or vice versa, attractive force 44 is created between inner magnet core 50 and outer magnet core 54 thereby moving piston 12 in second direction 46 longitudinally in cylinder 14.

As shown in FIGS. 1-2, in select embodiments of hybrid compressed gas-electric piston engine 10, inner magnet core 50 with inner coil 48 embedded therein may be affixed approximate top 56 of piston 12. In this embodiment, outer magnet core 54 with outer coil 52 embedded therein may be affixed to center head 58 around top portion 60 of cylinder 14. In this embodiment, when first current 36 is applied to both inner coil 48 and outer coil 52, repulsive force 38 is created between inner magnet core 50 and outer magnet core 54 thereby moving piston 12 in first direction 40 down cylinder 14 away from center head 58. And when opposite current 42 is applied to inner coil 48 and first current 36 is applied to outer coil 52, or vice versa, attractive force 44 is created between inner magnet core 50 and outer magnet core 54 thereby moving piston 12 in second direction 46 up cylinder 14 toward center head 58.

As best shown in FIG. 2, in select embodiments of hybrid compressed gas-electric piston engine 10, inner coil 48 and outer coil 52 may include windings of copper or aluminum wire 62. These windings of copper or aluminum wire 62 may be configured to create a magnetic field in the inner magnet core 50 and the outer magnet core 54, respectively.

Still referring to FIGS. 1-2, in select embodiments of hybrid compressed gas-electric piston engine 10, piston 12 may include attachment means 66 for inner magnet core 50 with inner coil 48 embedded therein. The attachments means 66 on piston 12 may be any attachment means, including any mechanical attachments. Or in other select embodiments, inner magnet core 50 with inner coil 48 embedded therein may be integrally formed with piston 12.

Still referring to FIGS. 1-2, in select embodiments of hybrid compressed gas-electric piston engine 10, inner magnet core 50 and outer magnet core 54 may include electric steel 68, or the like, configured to concentrate magnetic flux generated by inner coil 48 and outer coil 52, respectively, to form defined electro magnets 70.

Still referring to FIGS. 1-2, in conventional engine design 106, pressurized gas 22 injects into the cylinder 14 when the piston 12 is at the top of its stroke creating high pressure in the normal squish volume, which surrounds the electric coils (48, 52) filling the gap between them creating a driving force on piston 12. Concurrent with the injected pressurized gas, current flows through coils (48, 52) creating like-pole magnetic fields generating repulsive force 38. The expanding pressurized gas cooling the coils (48, 52) and increasing in pressure absorbs the heat from the energized coils (48, 52). At the bottom of the stroke, the exhaust valve 144 opens and the current in one of the coils (48 or 52) reverses creating attractive force 44 pulling piston 12 up and exhausting the expanded pressurized gas 22 continuing to cool the coils (48, 52).

Alternately, the coils only energize on the up-stroke providing intermittent use of the coils improving high current usage by reducing its duty cycle to 50%.

Referring not to FIGS. 4-11, in other select embodiments of hybrid compressed gas-electric piston engine 10, first electromagnetic component 18 may be first magnetic material 72 affixed to piston 12, and second electromagnetic component 20 may be second electromagnet 34 fixed in position on engine 10 relative to the cylinder, or vice versa, thereby creating solenoid driven piston 74. In these solenoid driven piston 74 embodiments of hybrid compressed gas-electric piston engine 10, when first current 36 is applied to second electromagnet 34, first directional force 76 may be created between first magnetic material 72 and second electromagnet 34 thereby moving solenoid driven piston 74 in first solenoid direction 78 longitudinally in cylinder 14 (see FIG. 7). And when opposite current 42 is applied to second electromagnet 34, second directional force 80 may be created between first magnetic material 72 and second electromagnet 34 thereby moving solenoid driven piston 74 in second solenoid direction 82 longitudinally in cylinder 14 (see FIG. 7).

Figure 7:
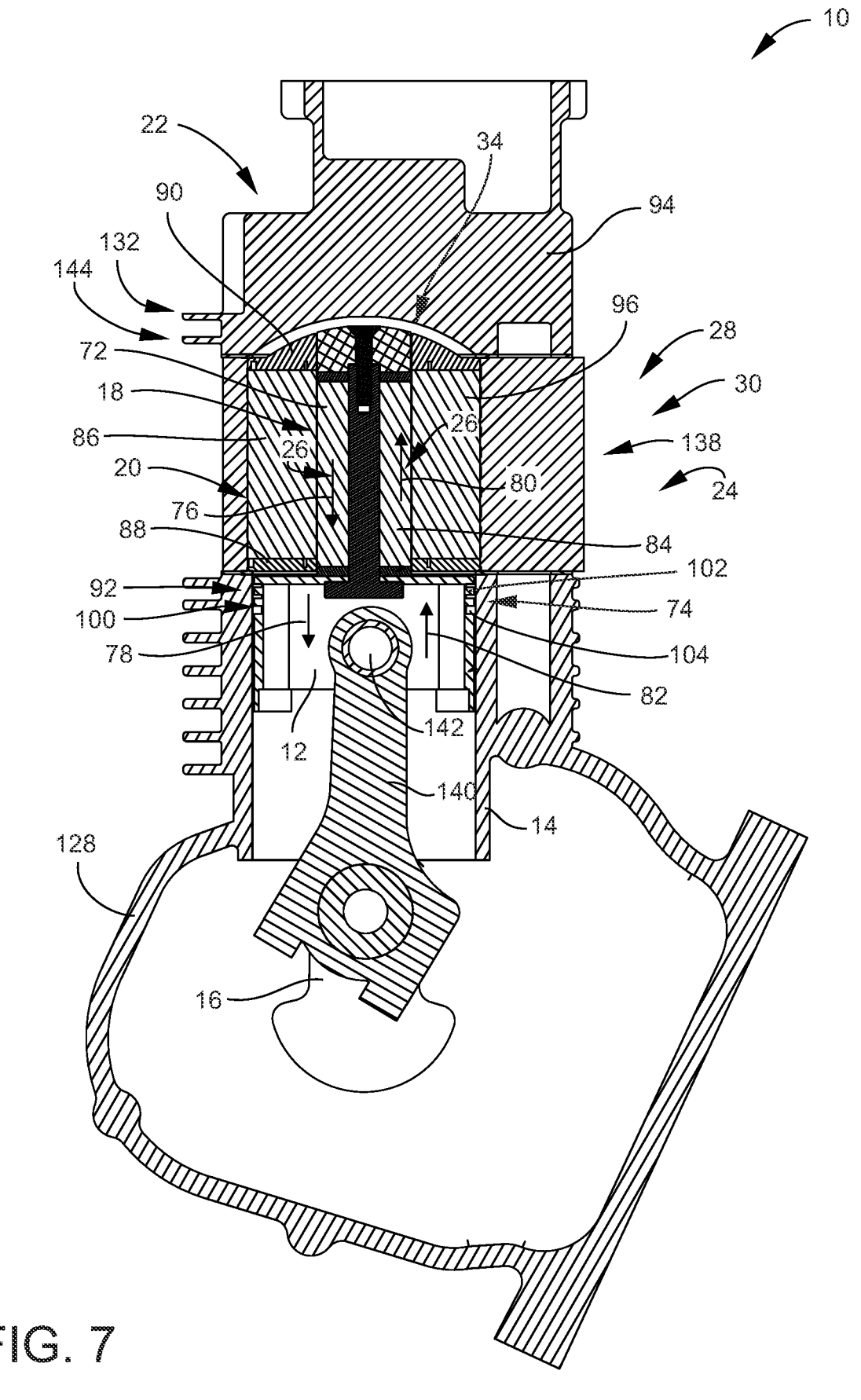
FIG. 7 is a sectional view of the hybrid compressed gas-electric piston engine from FIG. 4 taken from the cross-section shown in FIG. 6.
Figure 8:
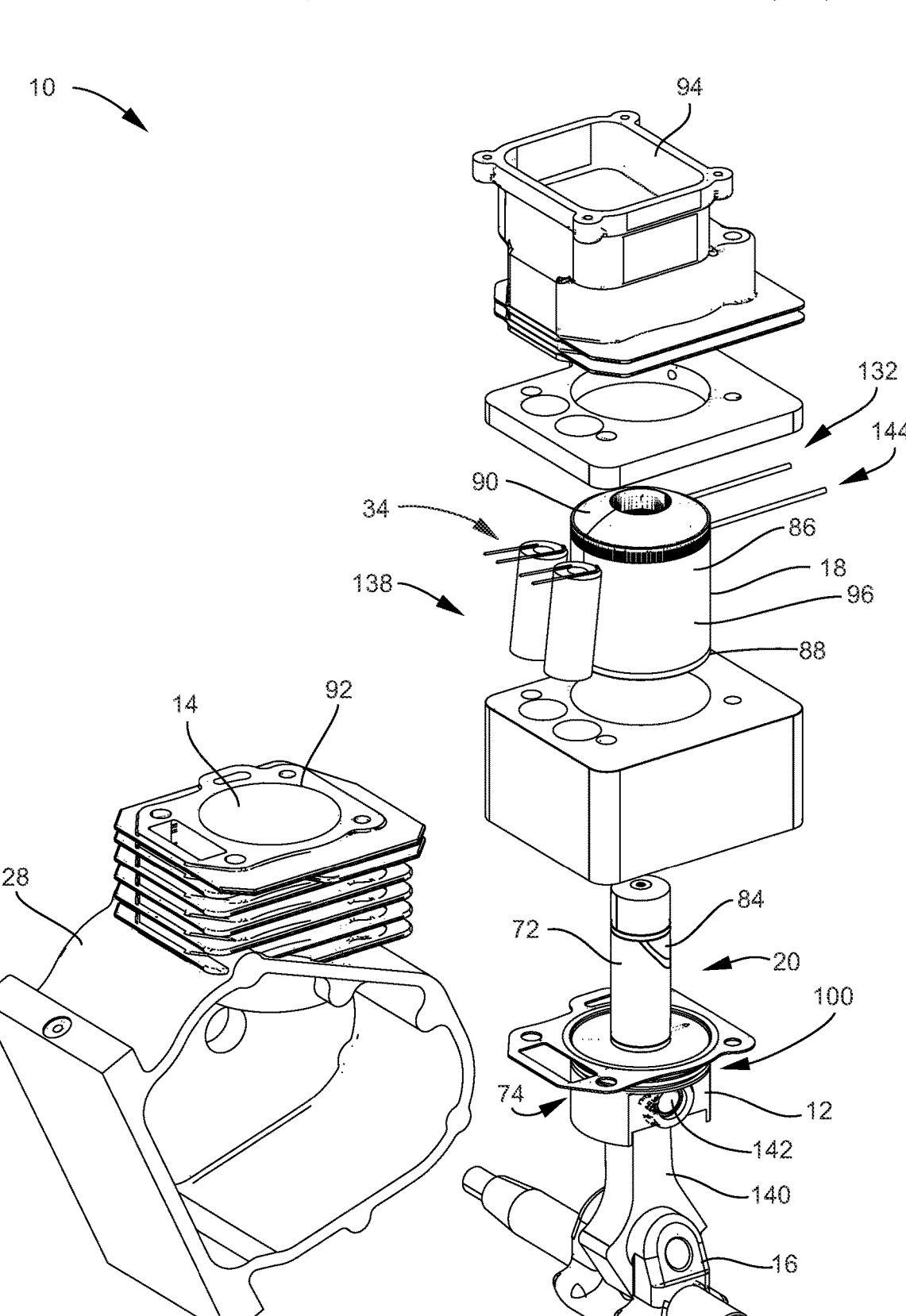
FIG. 8 is an exploded view of the hybrid compressed gas-electric piston engine from FIG. 4.
Figures 9A, 9B, 9C, 9D, 9E:
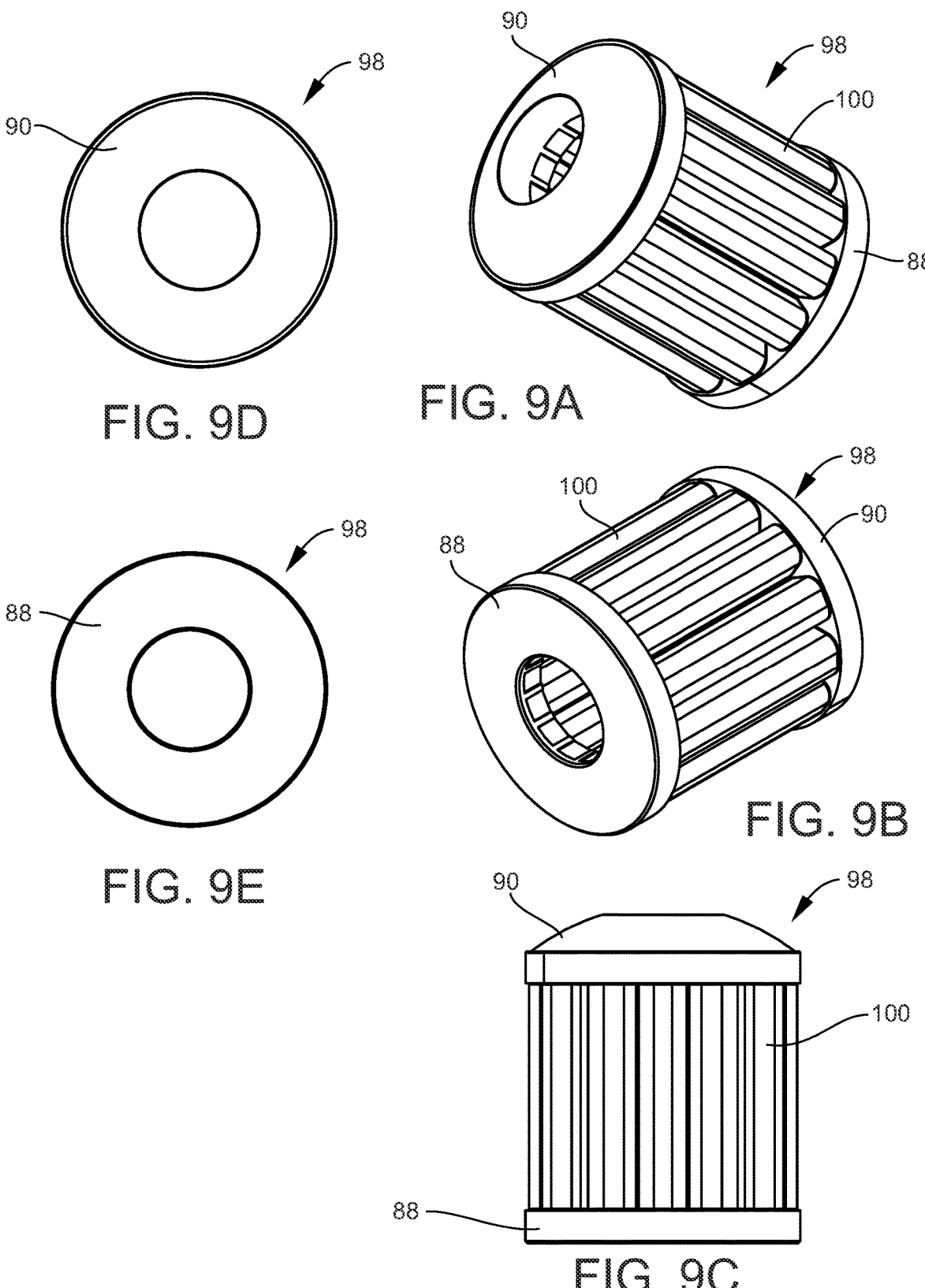
FIG. 9A is a top perspective view of an array of laminated coil assemblies according to select embodiments of the instant disclosure for use in the air electric module of the hybrid compressed gas-electric piston engine from FIG. 4 as a substitute for the single cylinder coil winding.
FIG. 9B is a bottom perspective view of the array of laminated coil assemblies from FIG. 9A.
FIG. 9C is a side view of the array of laminated coil assemblies from FIG. 9A.
FIG. 9D is a top view of the array of laminated coil assemblies from FIG. 9A.
FIG. 9E is a bottom view of the array of laminated coil assemblies from FIG. 9A.
Figures 11C, 11D, 11E:
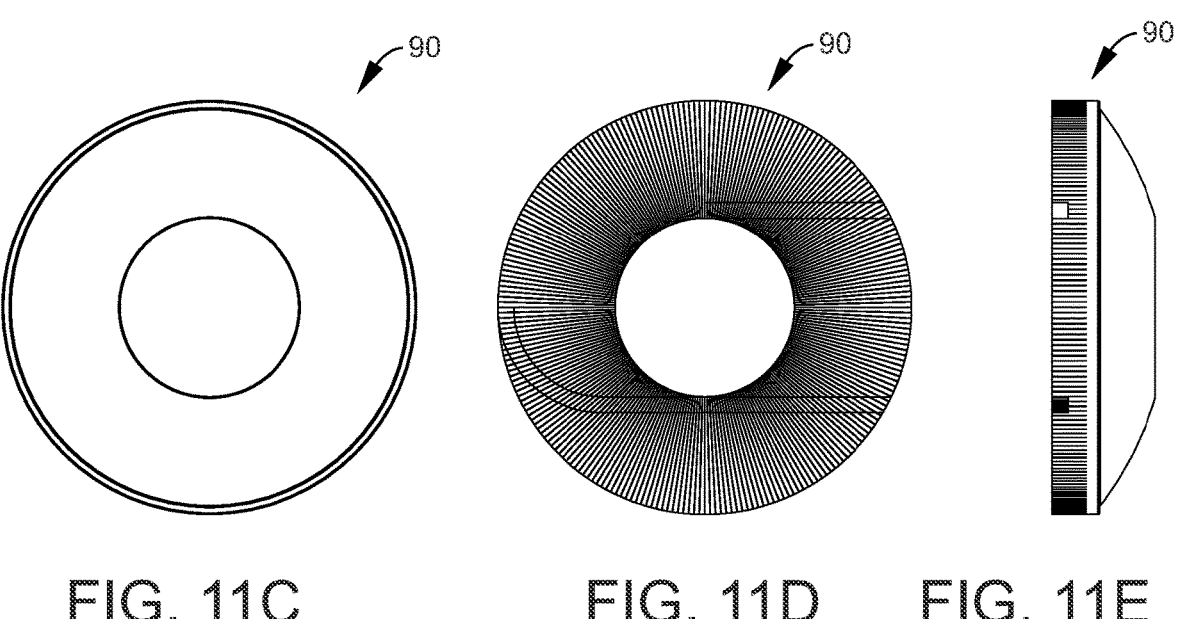
FIG. 11C is a top view of the top flux plate from FIG. 11A.
FIG. 11D is a bottom view of the top flux plate from FIG. 11A.
FIG. 11E is a side view of the top flux plate from FIG. 11A.
Figures 11A, 11B:
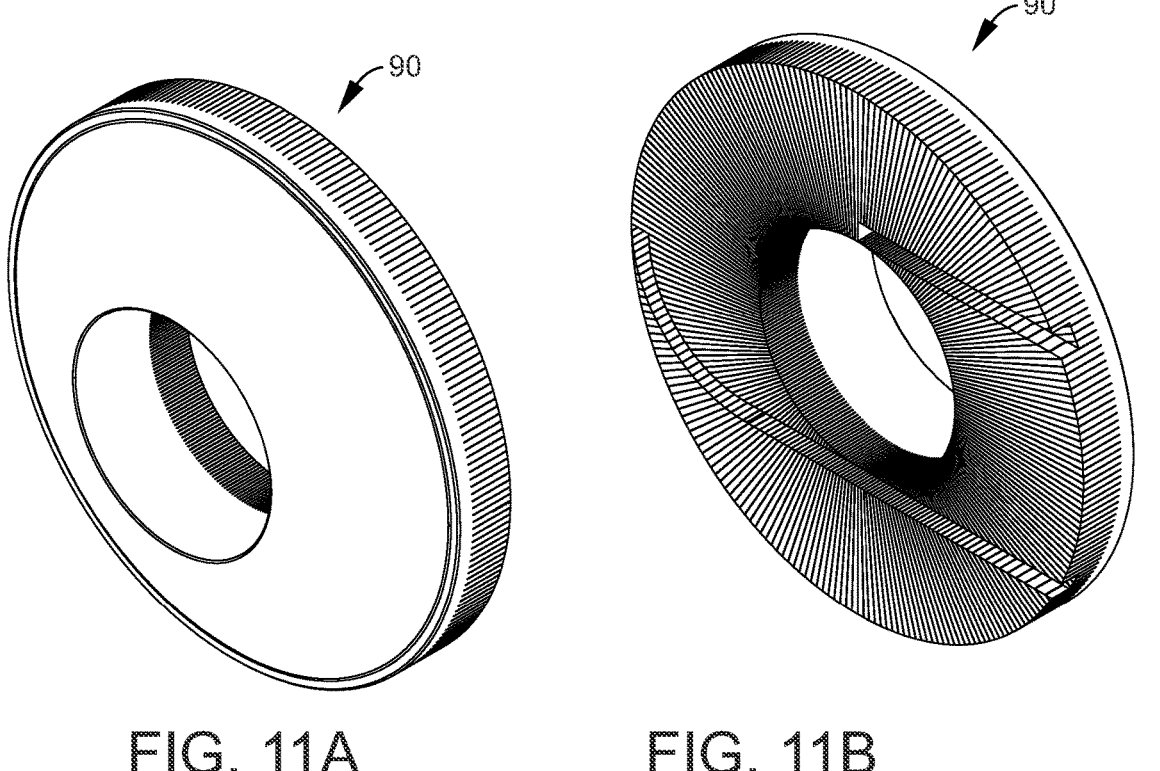
FIG. 11A is a top perspective view of top flux plate according to select embodiments of the instant disclosure for use in the air electric module of the hybrid compressed gas-electric piston engine from FIG. 4.
FIG. 11B is a bottom perspective view of the top flux plate from FIG. 11A.

As best shown in FIG. 7, in select embodiments of hybrid compressed gas-electric piston engine 10, first magnetic material 72 affixed to piston 12 may be piston magnet 84 that may be affixed to piston 12 and may extend from top 56 of piston 12 above cylinder 14. In these embodiments, second electromagnet 34 may be coil winding 86 that may be positioned above cylinder 14 with piston magnet 84 configured to move longitudinally therein. In select embodiments, coil winding 86 of second electromagnet 34 may be positioned between bottom flux plate 88 and top flux plate 90. Wherein bottom flux plate 88 may be positioned at top 92 of cylinder 14 and top flux plate 90 may be positioned under engine head 94. In select embodiments, coil winding 86 of second electromagnet 34 may be single cylinder coil winding 96 (as shown in FIG. 7). In other select embodiments, coil winding 86 of second electromagnet 34 may be an array 98 of laminated coil assemblies 99 (see FIGS. 9-10). Array 98 of laminated coil assemblies 99 may be configured to reduce the voltage required to be carried over wiring to second electromagnet 34.

Referring still to FIGS. 4-11, hybrid compressed gas-electric piston engine 10 transforms a piston engine by marrying electromotive components into the engine. Stored UHPG (ultra-high pressure gas), typically air, and/or electric current (together or each separately) powers the engine with no harmful emissions. In simple terms, hybrid compressed gas-electric piston engine 10 consists of appending an electric servo into a piston engine while maintaining the engine's gas expansion functionality. As best shown in FIG. 7, a single piston 12 engine has been upfitted with hybrid compressed gas-electric piston engine 10. However, the disclosure is not so limited to, and hybrid compressed gas-electric piston engine 10 can be applied to any piston engine regardless of the number of pistons it contains. The engine may be disassembled and the piston(s) 12 removed. The piston 12 may be modified by machining a concentric hole and flat to install a flanged and tapped aluminum rod. The rod is placed through the hole with the flange inside the piston 12; piston magnet 84 as a hollow permanent magnet or small toroidal coil winding and end cap washers are slid onto the rod with a top cap; a flat head screw secures the whole magnetic assembly to piston 12. A center block is placed between the main engine block 128 and the engine head 94. The center block or head 58 or air electric module 138 contains an outer toroidal coil assembly (single cylinder coil winding 96 or array 98 of coil laminated assemblies 99) that surrounds the piston's magnetic assembly creating a linear servo functionality. The outer toroidal coil assembly can be a single air core solenoid winding 96 or an array 98 of coil assemblies 99 that incorporate steel laminated cores. The engine is now capable of operating in three modes as a power unit, compressor, or generator described as follows:

Compressor; electric current energizes the outer coil winding(s) setting up a like pole scenario with the piston's magnet/coil creating repulsive force 38 pushing piston 12 down in cylinder 14. The intake valve is open allowing air to pass by and through the electromotive components and into cylinder 14. The outer coil is energized in the inverse direction creating an opposite pole scenario pulling piston 12 up in the cylinder forcing the air out through exhaust valve 144 compressing it into a container.

Generator; a gas direct injector has replaced the original sparkplug and is used to inject compressed air into cylinder 14 of the engine. The air passes by and through the electromotive components and into cylinder 14 forcing piston 12 and magnetic assembly down. The magnetic assembly moving through the outer coil windings creates a current flow. The momentum of piston 12 turning the crankshaft and flywheel forces the piston up in the cylinder again moving the magnetics through the outer coil winding creating a current flow in the opposite direction as the air in the cylinder passes by and through the electromotive components as it exits through the exhaust valve.

Power Unit; the electromotive components operate exactly as when compressing and the compressed air operates as when in generator mode simultaneously. The expanding air absorbs the electromotive component's emitted heat recovering electric energy loss.

Another feature of hybrid compressed gas-electric piston engine 10 may be that compressed gas 22 may be any compressed or high-pressure gas, including, but not limited to, high-pressure air, high-pressure steam, an external combusted fuel, or another highly compressed gas. In select possibly preferred embodiments, compressed gas 22 may be high-pressure air or highly compressed air.

As best shown in FIGS. 1, 2 and 7, in select embodiments of hybrid compressed gas-electric piston engine 10, piston 12 may include mountings 100 for sealing rings, like compression sealing rings 102 and/or lubrication sealing rings 104. As such, in select embodiments of hybrid compressed gas-electric piston engine 10, mountings 100 may be for both at least one compression sealing ring 102 and at least one lubrication sealing ring 104.

As shown in FIGS. 1-2 and 4-8, another feature of hybrid compressed gas-electric piston engine 10 may be that it can be used on conventional engine 106.

Figure 3:
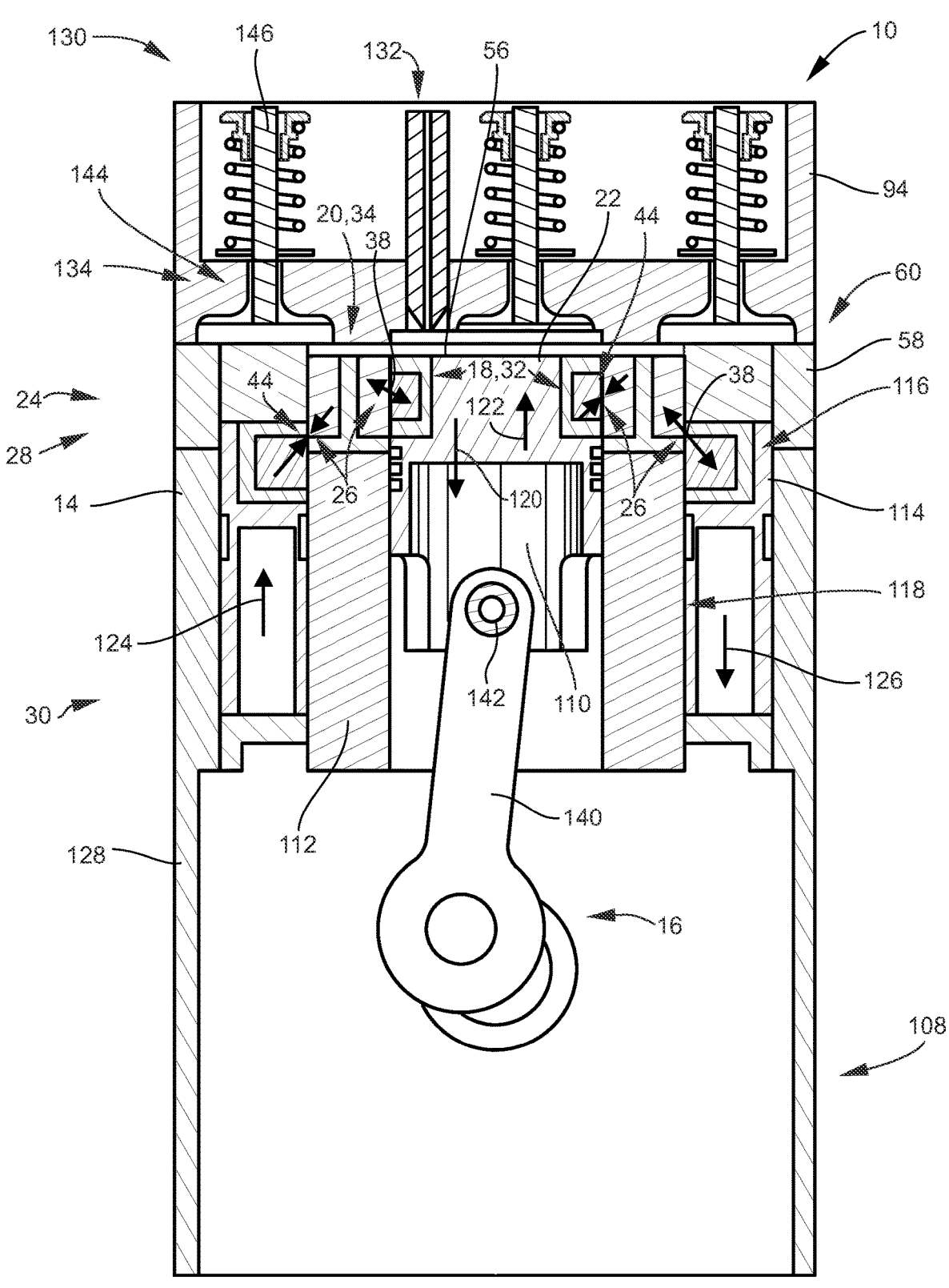
FIG. 3 is a sectional view of the hybrid compressed gas-electric piston engine according to select embodiments of the instant invention being used with a coincycle engine.
Figure 4:
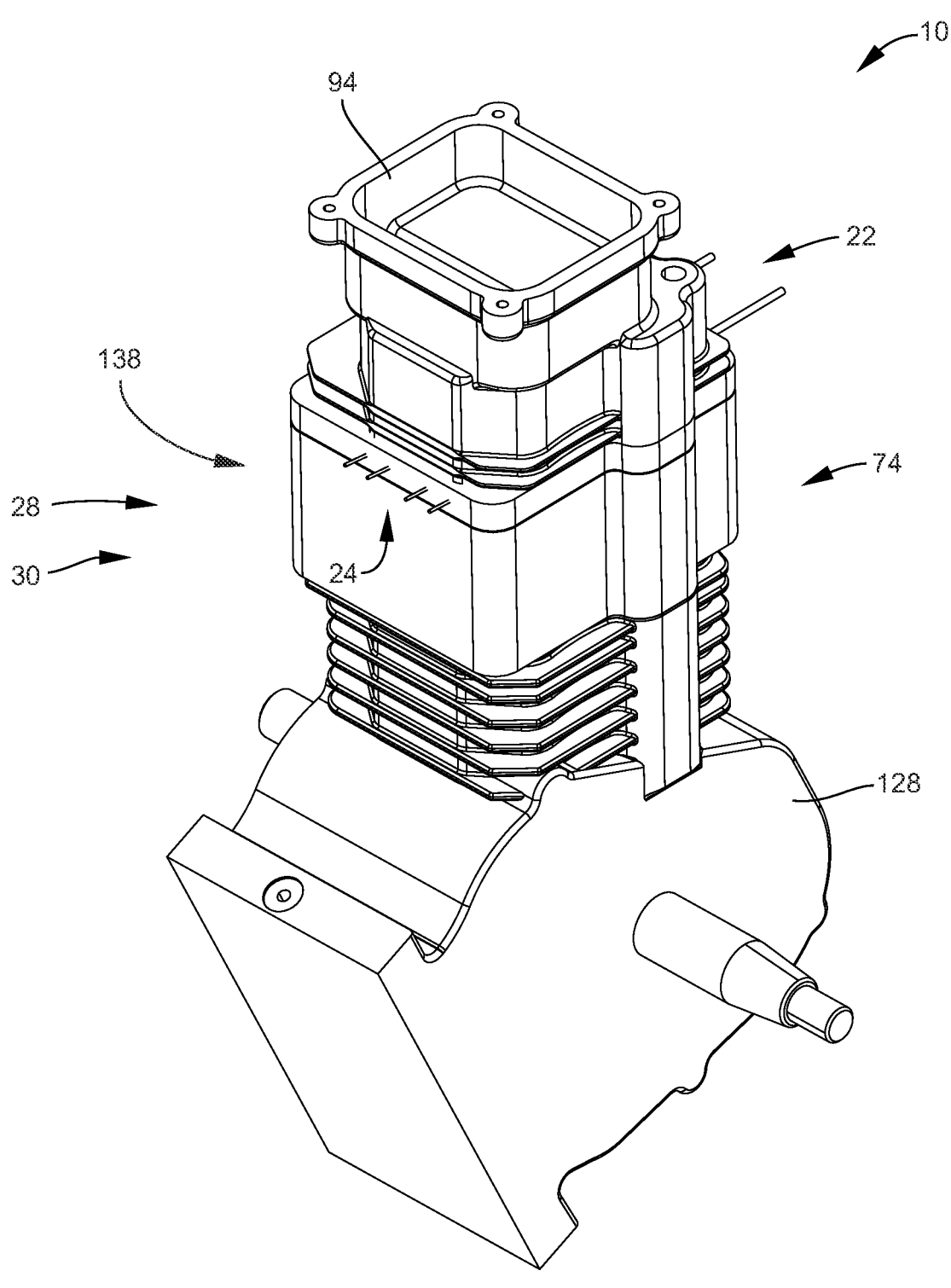
FIG. 4 is a top perspective view of the hybrid compressed gas-electric piston engine according to select embodiments of the instant invention being used with a conventional compressed air engine with an air electric module according to select embodiments added to convert the piston into a solenoid driven piston.
Figure 5:
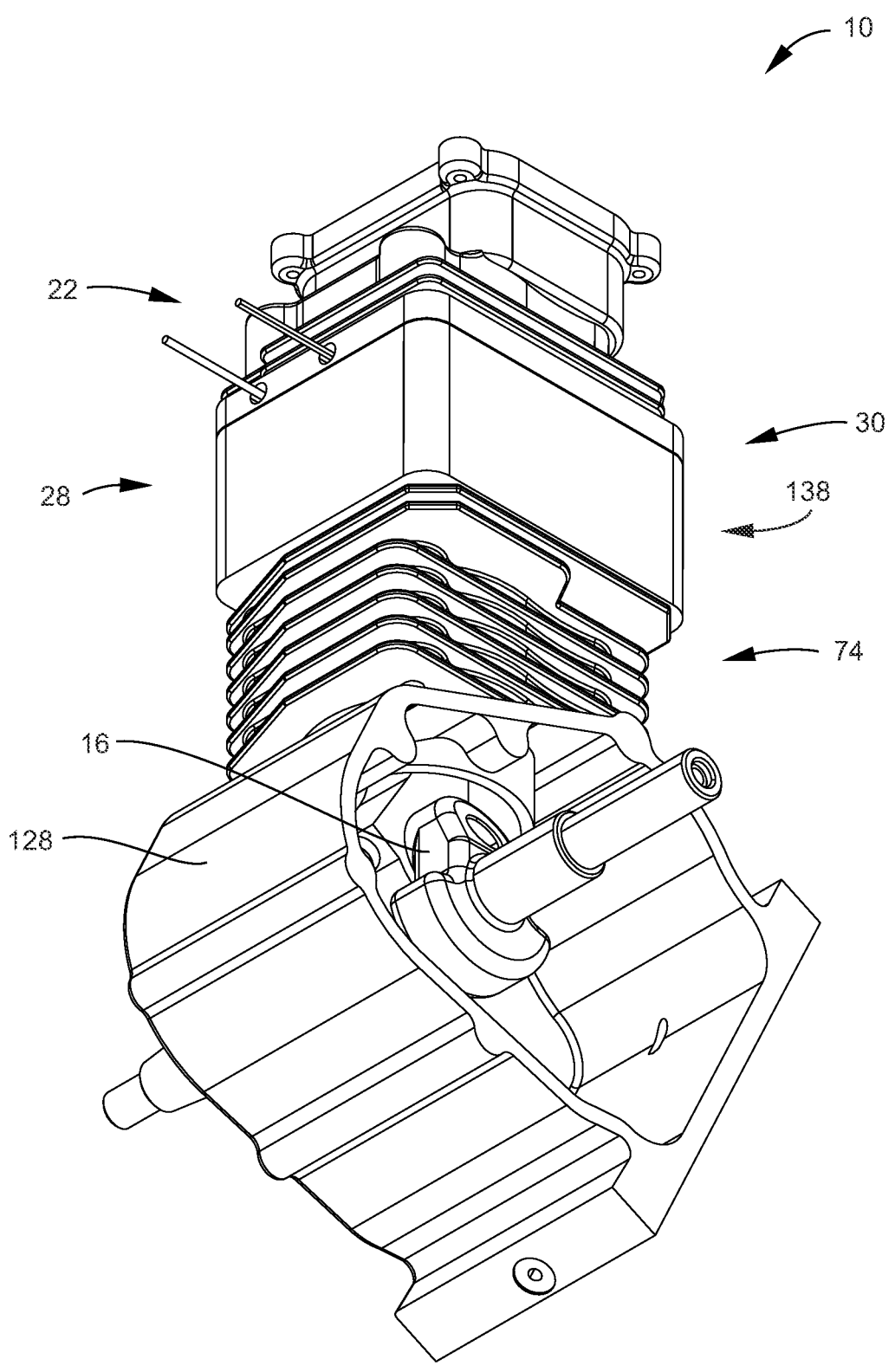
FIG. 5 is a bottom perspective view of the hybrid compressed gas-electric piston engine from FIG. 4.
Figure 6:
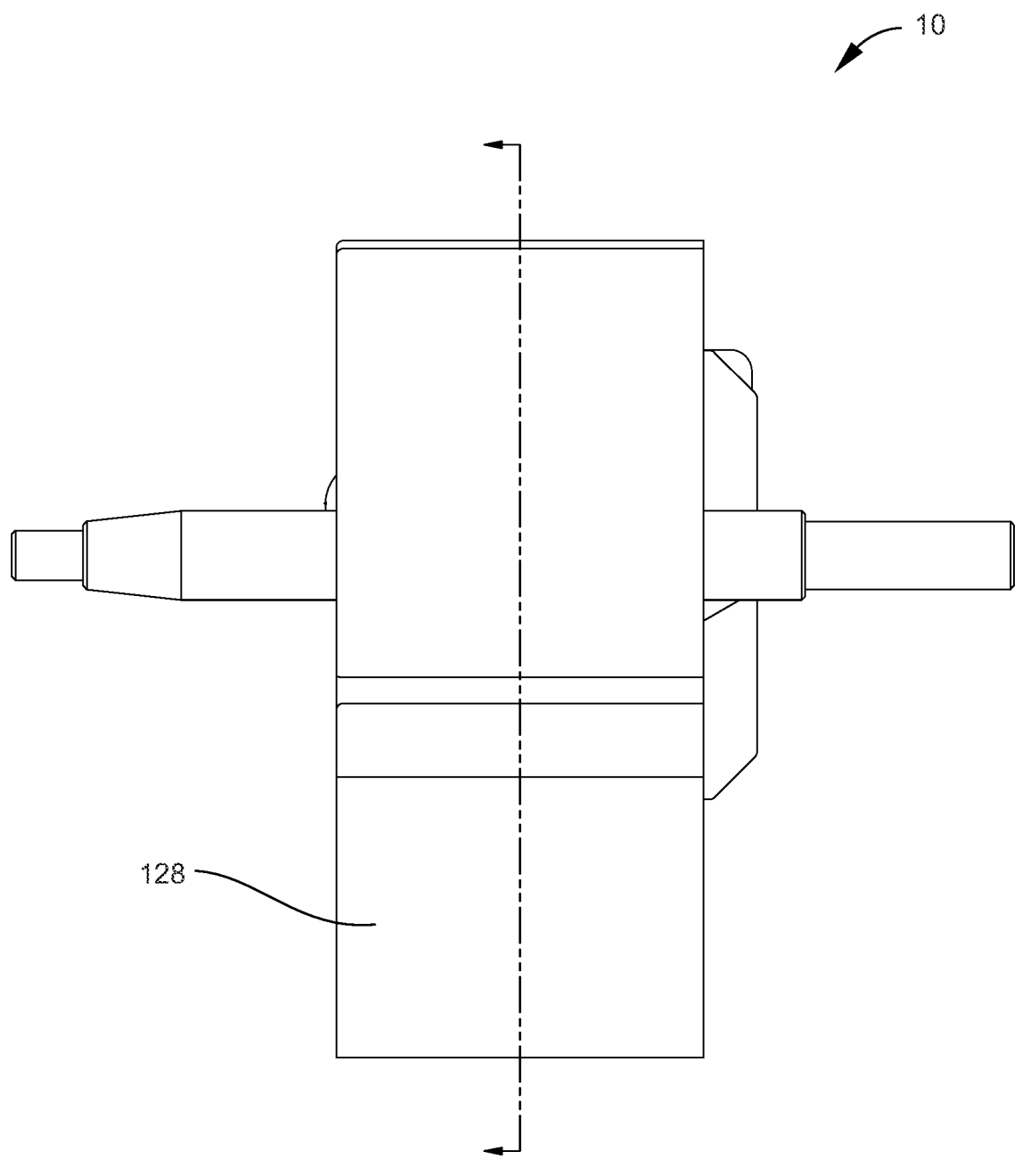
FIG. 6 is a bottom view of the hybrid compressed gas-electric piston engine from FIG. 4.

Referring now specifically to FIG. 3, another feature of hybrid compressed gas-electric piston engine 10 may be that it can be used on coincycle engine 108. Embodiments of coincycle engine 108 may be shown in U.S. Pat. No. 9,016,256, referred to herein in its entirety. In select coincycle engine 108 embodiments, hybrid compressed gas-electric piston engine 10 may include inner piston 110 with first electromagnet 32 affixed thereto. Center sleeve 112 may be included with second electromagnet 34 affixed thereto. Inner piston 110 may be configured to move longitudinally in center sleeve 112. Outer toroidal piston 114 may be included with third electromagnet 116 affixed thereto. Outer toroidal piston 114 may be configured to move longitudinally along outside 118 of center sleeve 112. Wherein, when first current 36 is applied to both first electromagnet 32 and second electromagnet 34, repulsive force 38 may be created between first electromagnet 32 affixed on inner piston 110 and second electromagnet 34 affixed on center sleeve 112 thereby moving inner piston 110 in first inner direction 120 longitudinally in center sleeve 112. When opposite current 42 is applied to first electromagnet 32 and first current 36 is applied to second electromagnet 34, or vice versa, attractive force 44 is created between first electromagnet 32 affixed on inner piston 110 and second electromagnet 34 affixed on center sleeve 112 thereby moving inner piston 110 in second inner direction 122 longitudinally in center sleeve 112. When first current 36 is applied to both second electromagnet 34 and third electromagnet 116, repulsive force 38 may be created between second electromagnet 34 affixed on center sleeve 112 and third electromagnet 116 affixed on outer toroidal piston 114 thereby moving outer toroidal piston 114 in first outer direction 124 longitudinally on outside 118 of center sleeve 112. And when opposite current 42 is applied to second electromagnet 34 and first current 36 is applied to third electromagnet 116, or vice versa, attractive force 44 is created between second electromagnet 34 affixed on center sleeve 112 and third electromagnet 116 affixed on outer toroidal piston 114 thereby moving outer toroidal piston 114 in second outer direction 126 longitudinally on outside 118 of center sleeve 112.

Still referring to FIG. 3, in a Coincycle engine 108 design, which has concentric pistons (inner piston 110 and outer toroidal piston 114) divided by center sleeve 112, pressurized gas 22 injects into the inner cylinder when inner piston 110 is at the top of its stroke creating high pressure in the squish volume surrounding the electric coils (32, 34) filling the gap between them. Concurrently or intermittently, current flows through the coils (32, 34) generating repulsive force 38 in inner piston 110. Simultaneously, the outer cylinder's coils (34, 116) energize to generate attractive force 44 to pull its outer toroidal piston 114 upward exhausting the gas in that cylinder. At the bottom of the inner piston 110 stroke a set of transfer valves 148 open between the inner cylinder's full volume and outer cylinder's squish volume allowing pressure to normalize between them. The greater surface area of the outer toroidal piston 114 creates a differential force on the outer toroidal piston 114 greater than on inner piston 110 thus driving outer toroidal piston 114 down allowing inner piston 110 to travel upward. Simultaneously, the coils (32, 116) energize to reverse the poles generating attractive force 44 on inner piston 110 and repulsive force 38 on outer toroidal piston 114. After inner piston 110 reaches the top of its stroke, the transfer valves 148 close and exhaust valve 144 opens in the outer cylinder. As the process repeats, the pressurized gas in the outer toroidal piston 114 is exhausted. Alternately, the coils only energize during half of the strokes providing intermittent use of the coils improving high current usage by reducing the duty cycle to 25%.

In both engine types, convention engine 106 and coincycle engine 108, pressurized gas or electricity can power the engine independently and is usable for both mobility and energy storage. When powered independently or by only one, pressurized gas or electric, the engine is capable of generating the other. When powered by pressurized gas it generates electricity and when powered by electricity it compresses gas to high pressure both of which can be stored for later use.

Referring now to FIGS. 1-8, in select embodiments, hybrid compressed gas-electric piston engine 10 may further include: an engine block 128 configured to provide mounting for all components; engine head 94 providing mounting for all valves assemblies 130, injectors 132, and seals 134 on all cylinders 14; injector 132 may be configured to allow high-pressure gas to fill cylinders 14; center head 58 or air electric module 138 configured for providing adaption for existing engine blocks to convert IC engines into an air-electric engine, where, for new engine assemblies, center head 58 or air electric module 138 can be configured to be incorporated into engine block 128; connecting rod 140; wrist pin 142; exhaust valve 144; valve spring assembly 146, the like, and/or combinations thereof.

Hybrid compressed gas-electric piston engine 10 may be configured to be used on conventional engine 106 and/or coincycle engine 108. In select embodiments, hybrid compressed gas-electric piston engine 10 may include: engine block 128, common to most piston engines, configured to provide mounting for all components as well as the whole assembly; piston 12/inner piston 110 containing mounting 100 for sealing rings both compression 102 and lubrication 104, the piston 12/inner piston 110 may be configured to provide attachment means 66 for the electric coil assembly, where the attachment can be mechanical or integral; coil windings of copper or aluminum wire 62 may be used to create magnetic field 64; magnet cores 50, 54 of electric steel 68 may be configured to concentrate magnetic flux generated by the coils to form defined electro magnets 70; center head 58 may provide adaption for existing engine blocks to convert IC engines into an Air-Electric engine, where, for new engine assemblies, center head 58 can be configured to be incorporate into engine block 128; engine head 94 may be for providing mounting for all valves assemblies 130, injectors 132, and seals 134 for all cylinders 14; injectors 132 may be configured to allow high-pressure gas to fill cylinders 14; crank 16; connecting rod 140; wrist pin 142; exhaust valve 144; valve spring assembly 146; outer toroidal piston 114 that is doughnut shaped and configured to contain mounting for both the outer and inner sealing rings for compression and lubrication; outer toroidal piston 114 may be configured to provide attachment means 66 for the electric coil assembly, where the attachment can be mechanical or integral; a transfer valve 148 configured to provide a pathway for inner piston gas to transfer to the outer toroidal piston 114, where transfer valve 148 may be configured to generally remain open during up-stroke of inner piston 110 and down-stroke of outer toroidal piston 114, the like, and/or combinations thereof.

The advantages of hybrid compressed gas-electric piston engine 10 may include, but are not limited to:

1) Pressurizing the cylinders externally improves the efficiency of the engine by eliminating virtually all pumping losses associated with combustion engines and both the intake and compression cycles providing two-stroke operation.

2) The design is relevant to conventional engines 106 and Coincycle piston engines 108.

3) In a Coincycle engine 108, the pressurized gas expands more completely through both the inner piston 110 and the outer toroidal piston 114.

4) The concentric electric coil windings independently energized work as a solenoid providing both attraction and repulsion forces to pull and push the piston up and down providing two-stroke operation.

5) Electric solenoids generate heat when energized. This heat limits the amount of current the coils can handle without failing. The heat is energy loss. The coils are located in the squish volume of the cylinder(s). Injecting highly pressurized gas into the cylinder acts as a cryogenic cooling agent substantially increased the amount of current the coils can endure.

6) Expanding gases require heat that it normally abstracts from its surroundings. The available heat of the surroundings limits the maximum pressure that the injected gas can have before going cryogenic and freezing its surroundings. The heat of the coils provides much of the heat needed for expansion allowing much higher initial gas pressures improving efficiency.

7) Conventional piston engines 106 offer a single expansion volume limiting the amount of pressurized gas that can expand in the cylinder thus limiting power output. The Coincycle engine 108 provides two expansion volumes allowing much higher injection pressures.

8) The electric coils and high-pressure gas can work independently for mobility or energy storage. Using the electric coils to drive the pistons while controlling the valves properly will compress/pressurize gas for storage.

9) Driving the pistons with pressurized gas while controlling the energizing of one coil will generate electricity in the other coil. The electricity could connect to the power grid or charge batteries.

10) Using the operation of #8 & 9 would allow a vehicle to use EV (electric vehicle) charging stations to replenish both its batteries and pressurized gas.

11) Using the operation of #8 & 9 would extend the useful output of renewable energies such as solar or wind by storing a portion of the energy generated.

12) A natural progression of this invention is that it can also improve combustion engines by aiding all of the cycles in both two and four stroke operation. This hybridization increases the efficiency of the engine and has similar advantages of reducing losses.

13) Another feature of the invention is that one of the coils that make up a solenoid pair could be permanent magnets in place of windings without changing the operation just the engine's power output.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

What is claimed is:

1. A hybrid compressed gas-electric piston engine comprising:

a piston configured to move longitudinally inside of a cylinder for rotating a crank shaft;

a first electromagnetic component affixed to the piston;

a second electromagnetic component affixed in position on the engine relative to the cylinder;

wherein, the piston is configured to be moved longitudinally inside of the cylinder for rotating the crank shaft via:

a compressed gas introduced into the cylinder;

electricity flowing into the first electromagnetic component affixed to the piston, the second electromagnetic component affixed in position on the engine relative to the cylinder, or both, thereby creating magnetic forces between the first electromagnetic component and the second electromagnetic component; or a combination thereof;

wherein the first electromagnetic component is a first electromagnet affixed to the piston, and the second electromagnetic component is a second electromagnet affixed in position on the engine relative to the cylinder, wherein:

when a first current is applied to both the first electromagnet and the second electromagnet, a repulsive force is created between the first electromagnet affixed on the piston and the second electromagnet affixed in position on the engine relative to the cylinder thereby moving the piston in a first direction longitudinally in the cylinder; and when an opposite current is applied to the first electromagnet and the first current is applied to the second electromagnet, or vice versa, an attractive force is created between the first electromagnet affixed on the piston and the second electromagnet affixed in position on the engine relative to the cylinder thereby moving the piston in a second direction longitudinally in the cylinder.

2. The hybrid compressed gas-electric piston engine of claim 1, wherein when the piston is being moved by the combination of the compressed gas and the electricity, the hybrid compressed gas-electric piston engine is configured to increase a performance and a duration of operation for use in zero emission vehicles, equipment, and any device that would use an electric motor or a piston engine.

3. The hybrid compressed gas-electric piston engine of claim 1, wherein:

when the piston is being moved via the compressed gas introduced into the cylinder, the hybrid compressed gas-electric piston engine is configured for creating the electricity via the magnetic forces between the first electromagnetic component and the second electromagnetic component; or when the piston is being moved via the magnetic forces created between the first electromagnetic component and the second electromagnetic component via the electricity, the hybrid compressed gas-electric piston engine is configured for creating the compressed gas; and whereby, the hybrid compressed gas-electric engine is configured to generate, store, and retrieve energy in the form of the compressed gas, the electricity, or both.

4. The hybrid compressed gas-electric piston engine of claim 1, wherein:

the first electromagnet affixed to the piston includes an inner coil with an inner magnet core;

the second electromagnet affixed in position on the engine relative to the cylinder includes an outer coil with an outer magnet core;

wherein:

when the first current is applied to both the inner coil and the outer coil, the repulsive force is created between the inner magnet core and the outer magnet core thereby moving the piston in the first direction longitudinally in the cylinder; and when the opposite current is applied to the inner coil and the first current is applied to the outer coil, or vice versa, the attractive force is created between the inner magnet core and the outer magnet core thereby moving the piston in the second direction longitudinally in the cylinder.

5. The hybrid compressed gas-electric piston engine of claim 4, wherein:

the inner magnet core with the inner coil embedded therein is affixed approximate a top of the piston; and the outer magnet core with the outer coil embedded therein is affixed to a center head positioned around or attached to a top portion of the cylinder.

6. The hybrid compressed gas-electric piston engine of claim 5, wherein:

when the first current is applied to both the inner coil and the outer coil, the repulsive force is created between the inner magnet core and the outer magnet core thereby moving the piston in the first direction down the cylinder away from the center head; and when the opposite current is applied to the inner coil and the first current is applied to the outer coil, or vice versa, the attractive force is created between the inner magnet core and the outer magnet core thereby moving the piston in the second direction up the cylinder toward the center head.

7. The hybrid compressed gas-electric piston engine of claim 4, wherein the inner coil and the outer coil including windings of copper or aluminum wire configured to create a magnetic field in the inner magnet core and the outer magnet core, respectively.

8. The hybrid compressed gas-electric piston engine of claim 4, wherein the piston including attachment means for the inner magnet core with the inner coil embedded therein, where the attachments means is mechanical, or the inner magnet core with the inner coil embedded therein is integrally formed with the piston.

9. The hybrid compressed gas-electric piston engine of claim 4, wherein the inner magnet core and the outer magnet core includes electric steel configured to concentrate a magnetic flux generated by the inner coil and the outer coil, respectively, to form defined electro magnets.

10. The hybrid compressed gas-electric piston engine of claim 1, wherein the first electromagnetic component is a first magnetic material affixed to the piston, and the second electromagnetic component is a second electromagnet fixed in position on the engine relative to the cylinder, or vice versa, thereby creating a solenoid driven piston, wherein:

when a first current is applied to the second electromagnet, a first directional force is created between the first magnetic material and the second electromagnet thereby moving the solenoid driven piston in a first solenoid direction longitudinally in the cylinder; and when an opposite current is applied to the second electromagnet, a second directional force is created between the first magnetic material and the second electromagnet thereby moving the solenoid driven piston in a second solenoid direction longitudinally in the cylinder.

11. The hybrid compressed gas-electric piston engine of claim 10, wherein:

the first magnetic material affixed to the piston is a piston magnet that is affixed to the piston and extends from a top of the piston above the cylinder; and the second electromagnet is a coil winding positioned above the cylinder with the piston magnet configured to move longitudinally therein.

12. The hybrid compressed gas-electric piston engine of claim 11, wherein the coil winding of the second electromagnet is positioned between a bottom flux plate and a top flux plate, wherein the bottom flux plate is positioned at a top of the cylinder and the top flux plate is positioned under an engine head.

13. The hybrid compressed gas-electric piston engine of claim 11 wherein the coil winding of the second electromagnet is a single cylinder coil winding or an array of laminated coil assemblies, the array of laminated coil assemblies being configured to reduce a voltage required to be carried over wiring to the second electromagnet.

14. The hybrid compressed gas-electric piston engine of claim 1, wherein the compressed gas is high-pressure air, high-pressure steam, an external combusted fuel, or another highly compressed gas;

wherein the piston includes mountings for sealing rings including the mountings for both at least one compression sealing ring and at least one lubrication sealing ring; and wherein, the hybrid compressed gas-electric piston engine is used on a conventional engine.

15. The hybrid compressed gas-electric piston engine of claim 1 being used on a coincycle engine.

16. The hybrid compressed gas-electric piston engine of claim 15, wherein the coincycle engine comprising:

an inner piston with a first electromagnet affixed thereto;

a center sleeve with a second electromagnet affixed thereto, the inner piston is configured to move longitudinally in the center sleeve;

an outer toroidal piston with a third electromagnet affixed thereto, the outer toroidal piston is configured to move longitudinally along an outside of the center sleeve;

wherein:

when a first current is applied to both the first electromagnet and the second electromagnet, a repulsive force is created between the first electromagnet affixed on the inner piston and the second electromagnet affixed on the center sleeve thereby moving the inner piston in a first inner direction longitudinally in the center sleeve;

when an opposite current is applied to the first electromagnet and the first current is applied to the second electromagnet, or vice versa, an attractive force is created between the first electromagnet affixed on the inner piston and the second electromagnet affixed on the center sleeve thereby moving the inner piston in a second inner direction longitudinally in the center sleeve;

when the first current is applied to both the second electromagnet and the third electromagnet, the repulsive force is created between the second electromagnet affixed on the center sleeve and the third electromagnet affixed on the outer toroidal piston thereby moving the outer toroidal piston in a first outer direction longitudinally on the outside of the center sleeve; and when the opposite current is applied to the second electromagnet and the first current is applied to the third electromagnet, or vice versa, the attractive force is created between the second electromagnet affixed on the center sleeve and the third electromagnet affixed on the outer toroidal piston thereby moving the outer toroidal piston in a second outer direction longitudinally on the outside of the center sleeve.

17. The hybrid compressed gas-electric piston engine according to claim 1 further comprising:

an engine block configured to provide mounting for all components;

a head providing mounting for all valves assemblies, injectors, and seals all cylinders;

an injector configured to allow high-pressure gas to fill the cylinders;

a center head or air electric module configured for providing adaption for existing engine blocks to convert IC engines into the hybrid compressed gas-electric piston engine, where, for new engine assemblies, the center head or air electric module can be configured to be incorporated into the engine block;

a connecting rod;

a wrist pin;

an exhaust valve; and a valve spring assembly.

18. A hybrid compressed gas-electric piston engine comprising:

a piston configured to move longitudinally inside of a cylinder for rotating a crank shaft;

a first electromagnetic component affixed to the piston;

a second electromagnetic component affixed in position on the engine relative to the cylinder;

wherein, the piston is configured to be moved longitudinally inside of the cylinder for rotating the crank shaft via:

a compressed gas introduced into the cylinder;

electricity flowing into the first electromagnetic component affixed to the piston, the second electromagnetic component affixed in position on the engine relative to the cylinder, or both, thereby creating magnetic forces between the first electromagnetic component and the second electromagnetic component; or a combination thereof;

wherein the first electromagnetic component is a first magnetic material affixed to the piston, and the second electromagnetic component is a second electromagnet fixed in position on the engine relative to the cylinder, or vice versa, thereby creating a solenoid driven piston, wherein:

when a first current is applied to the second electromagnet, a first directional force is created between the first magnetic material and the second electromagnet thereby moving the solenoid driven piston in a first solenoid direction longitudinally in the cylinder; and when an opposite current is applied to the second electromagnet, a second directional force is created between the first magnetic material and the second electromagnet thereby moving the solenoid driven piston in a second solenoid direction longitudinally in the cylinder;

wherein:

the first magnetic material affixed to the piston is a piston magnet that is affixed to the piston and extends from a top of the piston above the cylinder; and the second electromagnet is a coil winding positioned above the cylinder with the piston magnet configured to move longitudinally therein; and wherein the coil winding of the second electromagnet is positioned between a bottom flux plate and a top flux plate, wherein the bottom flux plate is positioned at a top of the cylinder and the top flux plate is positioned under an engine head.

19. A hybrid compressed gas-electric piston engine comprising:

a piston configured to move longitudinally inside of a cylinder for rotating a crank shaft;

a first electromagnetic component affixed to the piston;

a second electromagnetic component affixed in position on the engine relative to the cylinder;

wherein, the piston is configured to be moved longitudinally inside of the cylinder for rotating the crank shaft via:

a compressed gas introduced into the cylinder;

electricity flowing into the first electromagnetic component affixed to the piston, the second electromagnetic component affixed in position on the engine relative to the cylinder, or both, thereby creating magnetic forces between the first electromagnetic component and the second electromagnetic component; or a combination thereof;

wherein, the hybrid compressed gas-electric piston engine is used on a coincycle engine, wherein the coincycle engine comprising:

an inner piston with a first electromagnet affixed thereto;

a center sleeve with a second electromagnet affixed thereto, the inner piston is configured to move longitudinally in the center sleeve;

an outer toroidal piston with a third electromagnet affixed thereto, the outer toroidal piston is configured to move longitudinally along an outside of the center sleeve;

wherein:

when a first current is applied to both the first electromagnet and the second electromagnet, a repulsive force is created between the first electromagnet affixed on the inner piston and the second electromagnet affixed on the center sleeve thereby moving the inner piston in a first inner direction longitudinally in the center sleeve;

when an opposite current is applied to the first electromagnet and the first current is applied to the second electromagnet, or vice versa, an attractive force is created between the first electromagnet affixed on the inner piston and the second electromagnet affixed on the center sleeve thereby moving the inner piston in a second inner direction longitudinally in the center sleeve;

when the first current is applied to both the second electromagnet and the third electromagnet, the repulsive force is created between the second electromagnet affixed on the center sleeve and the third electromagnet affixed on the outer toroidal piston thereby moving the outer toroidal piston in a first outer direction longitudinally on the outside of the center sleeve; and when the opposite current is applied to the second electromagnet and the first current is applied to the third electromagnet, or vice versa, the attractive force is created between the second electromagnet affixed on the center sleeve and the third electromagnet affixed on the outer toroidal piston thereby moving the outer toroidal piston in a second outer direction longitudinally on the outside of the center sleeve.

20. A hybrid compressed gas-electric piston engine comprising:

a piston configured to move longitudinally inside of a cylinder for rotating a crank shaft;

a first electromagnetic component affixed to the piston;

a second electromagnetic component affixed in position on the engine relative to the cylinder;

wherein, the piston is configured to be moved longitudinally inside of the cylinder for rotating the crank shaft via:

a compressed gas introduced into the cylinder;

electricity flowing into the first electromagnetic component affixed to the piston, the second electromagnetic component affixed in position on the engine relative to the cylinder, or both, thereby creating magnetic forces between the first electromagnetic component and the second electromagnetic component; or a combination thereof;

an engine block configured to provide mounting for all components;

a head providing mounting for all valves assemblies, injectors, and seals all cylinders;

an injector configured to allow high-pressure gas to fill the cylinders;

a center head or air electric module configured for providing adaption for existing engine blocks to convert IC engines into the hybrid compressed gas-electric piston engine, where, for new engine assemblies, the center head or air electric module can be configured to be incorporated into the engine block;

a connecting rod;

a wrist pin;

an exhaust valve; and a valve spring assembly.

* * * * *